Nov. 27, 1962    K. GEBELE ETAL    3,065,683
PHOTOGRAPHIC CAMERA
Filed March 7, 1960
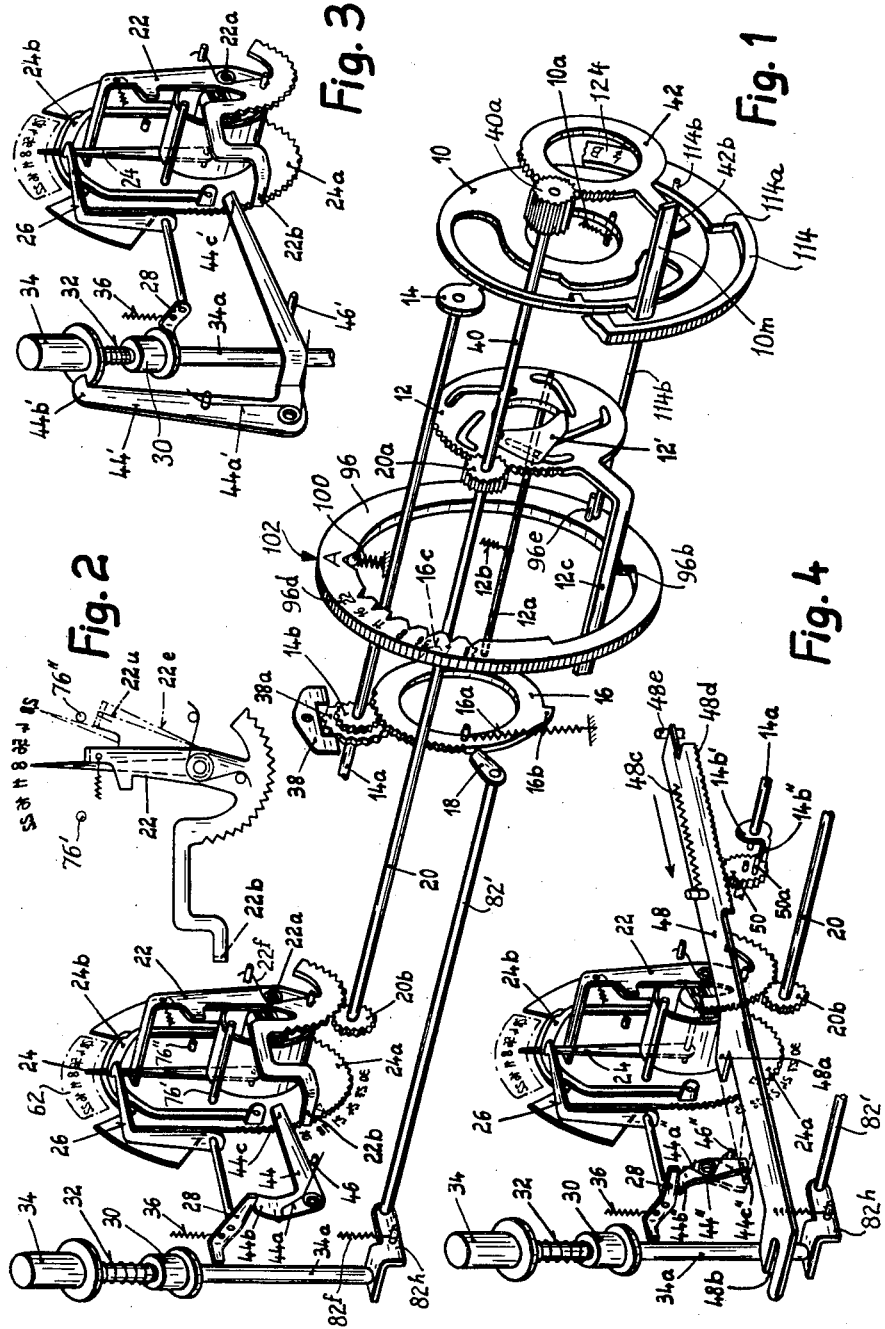

United States Patent Office 3,065,683
Patented Nov. 27, 1962

3,065,683
PHOTOGRAPHIC CAMERA
Kurt Gebele and Franz Singer, Munich, Germany, assignors to Compur-Werk G.m.b.H. & Co., Munich, Germany, a firm of Germany
Filed Mar. 7, 1960, Ser. No. 13,082
Claims priority, application Germany Mar. 10, 1959
5 Claims. (Cl. 95—10)

The present invention relates to a photographic camera, and more particularly to setting the exposure value of a still camera.

An object of the invention is the provision of generally improved and more satisfactory exposure value setting mechanism for a photographic camera.

Another object is the provision of an improved mechanism for automatically setting the diaphragm aperture of a camera, arranged to assure that the automatic mechanism completes its operation despite premature release of the manually operated camera release member.

Yet another object is the provision of improved mechanism for automatically setting the diaphragm aperture and shutter speed in accordance with an exposure meter, when desired, the mechanism having provision for optically setting the diaphragm and shutter speed manually rather than automatically.

A further object is to provide an improved apparatus for the automatic setting of the diaphragm of still cameras of the type having an exposure meter and a stop member which can be set to a limit position against the action of a return spring, the stop member either itself constituting the diaphragm control member, or being coupled with the same and being held directly or indirectly upon return from the limit position by a pointer of the exposure meter which is clamped fast by means of a manually actuating clamping device.

A still further object of the invention is the provision of such an apparatus which assures that the clamping fast of the pointer will be retained even if the actuating member which effects it should, by error, be released prematurely, to prevent the automatic diaphragm system from returning into its rest position to thereby change the diaphragm aperture before the exposure is completed, particularly in the case of long, automatically controlled exposure times.

These and other desirable objects may be attained in the manner disclosed as an illustrative embodiment of the invention in the following description and in the accompanying drawings forming a part hereof, in which:

FIG. 1 is a schematic perspective view of the essential drive members of a first embodiment of the invention, the mounting of these elements on the objective shutter and in the camera having been omitted for the sake of clarity;

FIG. 2 is an enlarged detail view of the meter pointer and feeler structure shown in FIG. 1;

FIG. 3 is a schematic perspective view of the rear portion of a second embodiment of the invention, it being understood that the front portion thereof is identical to that shown in FIG. 1; and FIG. 4 is a fragmentary perspective view similar to FIG. 3 of still a third embodiment of the invention.

The same reference numerals throughout the several views indicate the same parts.

The exposure value setting mechanism according to the invention is applied to a camera having an objective shutter and a built-in exposure meter, the camera otherwise being of any suitable known type and manner of operation. The present invention is an improvement over the exposure value setting mechanism disclosed in the copending patent applications of K. Gebele, Serial No. 842,145, filed September 24, 1959, and Serial No. 853,648, filed November 17, 1959 (now Patent 2,969,004, granted January 24, 1961). The shutter contains the usual shutter speed control ring 10, rotatable about the optical axis and bearing on a shutter housing not here shown but corresponding to the mounting described in the prior application 842,145. The shutter speed control ring 20 therein corresponds to the present ring 10.

The speed control ring 10 is rotatable in the conventional manner for adjusting the timing between the opening and closing of the shutter blades, not here shown. The shutter blade operating mechanism may, for example, take the form disclosed in British Patent 769,086 of Deckel, published February 27, 1957, or the closely similar form disclosed in United States Patents 2,900,885 and 2,900,886, of Gebele, issued August 25, 1959. As customary in a shutter of this type or style, the shutter is usually cocked or tensioned by a shaft which is connected to the film winding or transport mechanism in the camera body, so that the shutter is tensioned automatically and simultaneously when the film is advanced. The tensioning shaft is indicated fragmentarily at 14a in FIG. 1 of the present drawings and corresponds in function to the shaft 14 in said British patent and the second mentioned United States patent, and the shaft 20 in the first mentioned United States patent. This tensioning shaft 14a, which lies parallel to the optical axis, is fixed to a tensioning disk 14 (corresponding to the tensioning disk 16 in the British patent) which serves to tension or cock the master member or drive member of the shutter mechanism, and the shaft also carries a pinion 14b serving the function of the teeth 90 in the British patent, meshing with the teeth of a control ring 16 (corresponding to the control ring 76 in the British patent) to move the control ring to its tensioned position when the shaft 14a is rotated.

The control ring 16 is acted upon by a spring 16a tending to turn the ring 16 in a counterclockwise direction to its rest or run-down position. A locking pawl 18 is operatively connected to a shutter release plunger or trigger 34, to be presently described, and serves to drop behind a projection 16b in the ring 16, to hold the ring in its cocked or tensioned position until the release plunger 34 is depressed, whereupon the locking pawl 18 is released. Another projection 16c on the ring 16 serves, when the ring is turned in a clockwise direction, to engage an axially extending pin 12a fixed to a diaphragm control ring 12 which is rotatable about the optical axis as a center and which has the movable control slots for actuating the diaphragm leaves 12′ which collectively make up an iris diaphragm. A spring 12b acting on the pin 12a tends to turn the diaphragm control ring 12 in a counterclockwise direction, to one of its limit positions, e.g., to the position of minimum diaphragm aperture. Upon tensioning the shutter and moving the control ring 16 in a clockwise direction, the projection 16c engages the driving pin 12a and shifts the diaphragm control ring 12 against the action of its return spring 12b to the limit value position with the diaphragm leaves 12′ fully open. The diaphragm is held in its maximum diaphragm aperture position by the latching of the locking pawl 18 against the projection 16b of the control ring 16.

The diaphragm control ring 12 is partially toothed on its periphery and meshes with a pinion 20a fixed to one end of an axially extending shaft 20, the other end of the shaft bearing another pinion 20b which is in meshing engagement with the toothing of a stop and feeler lever 22 swingably supported on a pivot 22a. The end of the stop lever 22 is turned rearwardly to be engageable with the measuring pointer 24 of a built-in photoelectric exposure meter, the stop lever 22 normally being urged in a clockwise direction out of engagement with the pointer 24 by means of a suitable spring 22f. The present stop lever 22 corresponds to the stop lever 178 disclosed in the copending prior application 853,648. Much of the structure of the FIG. 7 embodiment of the said Patent No. 2,969,004 is similar to the present construction, and reference may be made thereto for a supplementary disclosure.

The measuring mechanism of the built-in photoelectric exposure meter having the pointer 24 is mounted on a supporting plate 24a rotatable in the camera body, the measuring mechanism of the meter being operatively coupled in any suitable manner with a photocell, not here shown. By turning the entire supporting plate 24a, the entire measuring mechanism can be turned bodily, so that its pointer 24 can be brought into any given angular position with respect to the camera. This bodily turning of the measuring mechanism of the meter, by turning the supporting plate 24a, may serve to introduce the variable factors of film speed into the mechanism. For this purpose, a suitable part of the mounting plate 24a projects from the camera body so as to be manually accessible to the operator, and it is turned to set any desirable film speed value, by bringing a reference mark on the plate 24a opposite the desired graduation of a film speed scale marked conveniently on the rear wall of the camera body or on a stationary portion visible through a window at the rear of the camera body. The reference mark and film speed scale are shown, but are unnumbered, and may correspond to the reference mark 106 and film speed scale 108 disclosed in the aforementioned Patent No. 2,969,004.

Mounted on the supporting plate 24a is a stirrup-like pivoted clamping member 24b which, when actuated by a swinging arm 26, presses against the forward face of the pointer 24 and clamps it fast against the stationary plate 24a located just to the rear of the pointer. This is effected by the camera release member 34 in the form of a plunger suitably mounted on the camera body to be depressed by a finger of the operator when it is desired to make an exposure. When the plunger 34 is depressed, this compresses a spring 32 which presses on a slidable sleeve 30, thereby moving the arm or lever 28 connected to the swinging arm 26, to cause the swinging arm 26 to move the clamping member 24b to clamp the pointer 24 in a stationary position so long as the downward pressure on the plunger 34 is continued. When the plunger is released to move upwardly again, a spring 36 connected to the lever 28 is arranged to pivot the lever clockwise and swing the arm 26 so that the pointer 24 is no longer clamped.

On the supporting plate 24a there are two stop pins 76' and 76" which limit the range of swinging movement of the pointer 24. The exposure meter has a circumferentially graduated diaphragm aperture scale arranged on a stationary and preferably transparent support 62, located so as to be visible through a window at the rear of the camera, for indicating the location of the pointer 24. The supporting plate 24a has two side wings, here unnumbered, in a position to swing in front of and cover part of the diaphragm scale, when the supporting plate 24a is swung a substantial angle one way or the other from its central position.

A diaphragm switching ring or control member 96 is mounted rotatably on the periphery of the shutter housing in an externally accessible position for manual actuation. The ring 96 serves as a controlling member to determine whether the diaphragm aperture is to be set automatically or manually, and if set manually, to determine what aperture is to be set. To this end, there are on the periphery of the ring 96 various suitable reference marks such as the mark "A" to be used for automatic setting, and a circumferentially graduated diaphragm aperture scale 96d to be used for manual setting, both cooperating with a stationary index mark 102. A detent of known type is provided to hold the ring 96 frictionally in any given position in which it has been set. For instance, a spring loaded detent ball 100 may engage in any one of a series of notches on the inner edge of the ring 96 successively brought opposite the ball 100 by rotation of the ring 96.

To set a particular diaphragm aperture manually on the shutter, the switching ring 96 is turned to bring the selected value on the diaphragm aperture scale 96d opposite the index mark 102. The ring 96 has on its inner edge a radial abutment or stop projection 96b which extends into the path of an arm 12c on the diaphragm control ring 12 upon its running down in a counterclockwise direction from its tensioned position. Thus, for manual settings of the diaphragm aperture, running down movement of the diaphragm control ring 12 is arrested by the engagement of the arm 12c with the abutment 96b to set diaphragm leaves 12' at the corresponding diaphragm aperture.

For automatic setting of the diaphragm aperture, the diaphragm switching ring 96 is rotated to place the mark "A" opposite the index mark 102. In this position of the ring 96, the abutment 96b is out of the range of the movement of the arm 12c, and running down movement of the diaphragm control ring 12 from its tensioned position is in this case limited by the abutment of the stop lever 22 with the clamped measurement pointer 24, acting through the shaft 20 and the pinions 20a and 20b.

In accordance with the invention, completely automatic setting of the shutter speed as well as the diaphragm aperture may be effected. In this fully automatic form of the invention, the automatic diaphragm mechanism is so connected with the shutter speed setting parts that a given time of exposure or shutter speed is normally associated with a given diaphragm aperture. For example, for an exposure value of 18, a shutter speed of 1/500 of a second may be associated with a diaphragm aperture of f:22, and for lower exposure values there are progressively lower shutter speeds and progressively larger diaphragm apertures, until there is reached a shutter speed of 1/30 of a second and a diaphragm aperture of f:2.8 for an exposure value of 8.

The shutter speed control ring 10 is rotatable about the optical axis and is provided with a spring 10a which tends to turn it in a counterclockwise direction. The diaphragm control ring 12 is releasably coupled with the speed control ring 10 so that in addition to setting the shutter speed automatically, the two rings 12 and 10 may be decoupled for manual setting of the shutter speed to, for instance, a "bulb" position, and a position for taking flash photographs. To accomplish this, the shaft 20 has an extension 40 extending forwardly of the pinion 20a, and at the other end of which is another pinion 40a, in meshing engagement with the partially toothed periphery of a driving ring 42 rotatable about the optical axis of the shutter forwardly of the speed control ring 10. A radial arm 42b on the driving ring 42 is in engagement with a forwardly extending arm 10m on the speed control ring 10, the two arms 42b and 10m being held releasably together by the spring 10a. Upon tensioning the diaphragm control ring 12, and rotating it in a clockwise direction to a position of maximum diaphragm aperture, the pinion 20a is rotated, and this rotation is transmitted through the shaft 40 to the other pinion 40a. The driving ring 42 is consequently also turned in a clockwise direction, and the arm 42b bearing on the arm 10m rotates the speed control ring 10 against the force of the spring 10a. The parts are so arranged that moving the diaphragm control ring 12 to its tensioned maximum aperture position results in a movement of the speed control ring 10 to its position corresponding to the slowest of the automatically timed exposures. As the ring 12 runs down toward minimum diaphragm aperture, the ring 10 runs down under the actuation of the spring 10a toward a position of faster shutter speed.

The shutter speed may be manually set independently of the diaphragm aperture setting, when desired, so that the speed control ring 10 may be stopped during its running down motion independently of the ring 12. For this purpose, a speed switching ring 114 is mounted rotatably near the front of the shutter housing to be accessible for manual actuation from the outside. The switching ring 114 has an internal radial abutment 114a which may be engaged by the arm 10m when the ring 114 is moved out of its automatic position to a position for manual setting. A scale 124 is provided on the periphery of the ring 114 to be set in cooperation with an index mark not here shown. The scale 124 illustrated has "B" position for bulb settings, i.e., shutter speeds which are manually timed, and also a lightning bolt representation for use when taking flash photographs. With the switching ring 114 in its automatic position, the shoulder 114a is out of the range of movement of the arm 10m. But when the ring 114 is shifted to its manual settings with one of the symbols of the scale 124 opposite the index mark, running down movement of the arm 10m is limited by engagement with the shoulder 114a which now lies in its path. Consequently, when the shutter speed is manually set and not automatically timed internally, the arm 42b on the driving ring 42 may become decoupled from the ring 10m so that the diaphragm aperture control ring 12 may run down to a position independent of that of the speed control ring 10.

The operation to this point will be reviewed briefly, before proceeding to the novel features of the present constructions. Assuming that automatic operation of the shutter is desired, the diaphragm switching ring 96 is positioned in its automatic setting with the "A" mark opposite the index 102, the ring being held frictionally in place by the detent 100. In similar fashion, the speed switching ring 114 is positioned in its automatic setting. In the automatic position of both rings 96 and 114, the setting of the shutter is completely automatic, the appropriate diaphragm aperture and the predetermined corresponding shutter speed being set simultaneously. The film speed is set on the camera by rotating the meter mechanism supporting plate 24a bodily to position the index mark thereon opposite the appropriate value on the film speed scale.

Upon the advance of the film, the tensioning shaft 14a is rotated to effect the tensioning of the shutter by the pinion 14b rotating the control ring 16 against the force of the spring 16a, in a clockwise direction. During the rotation of the ring 16, the projection 16c thereon engages the pin 12a to rotate the diaphragm control ring 12 likewise in a clockwise direction, against the force of the spring 12b, to the limit position of maximum diaphragm aperture. Rotation of the ring 12 is transmitted to the pinion 20a, and through the shaft 20 and other pinion 20b to the stop and feeler lever 22. As the diaphragm control ring 12 moves into its fully tensioned position of maximum diaphragm aperture, the lever 22 is rotated clockwise against the force of the spring 22f to a limiting initial position.

As the control ring 16 moves toward its fully tensioned clockwise position, its projection 16b rides past the locking pawl 18, and is latched against running down movement until the camera release plunger 34 is operated. As the diaphragm control ring 12 is rotated clockwise to its maximum aperture position, the speed control ring 10 is simultaneously rotated toward its position of slowest automatically internally timed speed. Thus, the pinion 40a on the shaft extension 40 drives the ring 42, and the arm 42b in engagement with the arm 10m on the speed control ring 10 is actuated to turn the ring 10 clockwise. Also, the rotation of the shaft 14a in the shutter tensioning or cocking direction rotates the drive member 14 to cock or tension the master member or main drive member (not shown) of the shutter.

The exposure meter measures the brightness of the scene to be photographed, its measuring pointer 24 assuming the appropriate measurement position. Upon depressing the shutter release plunger or trigger 34, the spring 32 is compressed to slide the sleeve 30 downwardly and pivot the lever arm 28 against the force of the spring 36. Actuation of the lever 28 swings the arm 26 to press the clamping member 24b rearwardly against the measuring pointer 24, the pointer 24 being clamped securely in place between the stationary plate 24a and the member 24b.

After the pointer 24 has been clamped in place, continued downward movement of the shutter release plunger shaft 34a depresses the lever 82h to turn the shaft 82' in a counterclockwise direction, against the force of the restoring spring 82f, to release the latching pawl 18 from the projection 16b on the control ring 16. Upon its release, the control ring 16 begins to run down under the action of the spring 16a, return movement in a counterclockwise direction being slightly delayed by an escapement anchor 38 which cooperates with an anchor wheel 38a seated on the tensioning shaft 14a. The projection 16c releases the pin 12a, and the diaphragm control ring 12 begins to run down under the action of the spring 12b, in a counterclockwise direction, thus turning the pinion 20a, the shaft 20, and the other pinion 20b, to cause counterclockwise pivoting of the stop and feeler lever 22. When the lever 22 strikes the clamped pointer 24, the ring 12 is held in a position at which its diaphragm leaves 12' assume the appropriate diaphragm aperture position for the brightness of the scene measured. At the same time that the ring 12 begins to run down, rotation of the pinion 20a is transmitted through the shaft 40 and pinion 40a to the driving ring 42, thereby causing counterclockwise rotation of the driving ring 42 and also of the speed control ring 10, whose arm 10m follows along after the arm 42b under the action of the spring 10a,. The rings 12 and 10 are thus stopped at about the same angular position during their running down movements, the speed control ring 10 being set for the shutter speed corresponding to the diaphragm aperture set on the diaphragm control ring 12. During the final portion of the running down movement of the tensioning ring 16, a release not here shown but corresponding, e.g., to the latch 166 in Patent 2,900,885 or the latch 66 in Patent 2,900,886 is operated to release the master member of the shutter to open and close the shutter blades (not shown) to take the exposure. These various movements of the parts, from the release of the latching pawl 18 (by downward finger pressure on the plunger or trigger 34) until the shutter blades have opened and closed and the control ring 16 has reached its fully run down or rest position, may be collectively described as the exposure-making cycle of operation.

Should it be desired to set manually a preselected diaphragm aperture on the shutter, the diaphragm switching ring 96 is rotated to aline the particular value desired on the scale 96d with the reference mark 102. Upon pressing the camera release plunger 34 to unlatch the locking pawl 18 and allow the control ring 16 to run down, the diaphragm control ring 12 in this case is limited in its running down movement by the engagement of the arm 12c with the radial abutment 96b on the ring 96. For this operation, the measurement pointer 24 may be swung to an out of the way position lying against the stop pin 76', outside the measurement range of the exposure meter and the swinging range of the stop lever 22. This may be done in the manner illustrated in FIG. 2 of Patent No. 2,969,004, wherein turning the switching ring 96 to a manually set position operates a lever 98 (not shown in the present application) to swing a shaft and other parts not here shown, to engage the measurement pointer (60' of the prior application and 24 of the present application) to swing it against the stop pin 76'. With the measurement pointer 24 swung out of the way against the stop pin 76', it can be seen that, even though clamped, it is ineffective to limit the stop and feeler lever 22 in its swinging movement as the diaphragm control ring runs down. The ring 12 instead is stopped at the diaphragm aperture position which has been preselected by the engagement of the arm 12c with the abutment 96b.

For a manual setting of the shutter speed, the speed switching ring 114 is rotated to aline the selected designation on the scale 124 with the index mark not here shown. In this case, running down of the speed control ring 10 in a counterclockwise direction under the force of the spring 10a is limited by the engagement of the forwardly projecting arm 10m with the radial abutment 114a. The arm 42b on the driving ring 42 may be uncoupled from the arm 10m at this point for further counterclockwise running down movement with the diaphragm control ring 12, until the ring 12 is set at the appropriate diaphragm aperture. When the switching ring 114 is returned from manual to automatic position, a pin 114b on this ring engages a pin 96e on the ring 96 to return the latter also to automatic position, so that the restoration thereof to automatic position will not be accidentally overlooked.

It may be observed in the construction which has been described, especially for the longer automatically timed shutter speeds, that should the camera release plunger 34 be released prematurely, the measurement pointer 24 may be unclamped before the stop and feeler lever 22 has swung around and engaged it to determine the diaphragm aperture position of the control ring 12. That is, removing pressure from the plunger 34 normally draws the sleeve 30 upwardly, and the lever arm 28 swings under the action of the spring 36, to swing the arm 26 forwardly and release the clamping action of the pointer 24 between the clamping member 24b and the supporting plate 24a. This unclamping of the pointer 24 may, through accidental error, occur before the stop and feeler 22 has engaged it to determine the appropriate diaphragm aperture for the existing illumination conditions. According to the invention, the measurement pointer 24 is clamped in place from the time that the camera release plunger 34 is initially depressed, until the shutter is cocked or tensioned simultaneously with the advance of the film, in preparation for the next exposure. Thus, a faulty operation of the shutter due to a premature release of the camera release plunger 34, resulting in a premature unclamping of the pointer 24, is prevented.

Referring to FIG. 1, the swinging lever 28 of the pointer clamping device is more particularly a double-armed lever whose rear arm is adapted to be engaged by the sleeve 30 and is biased to upper position by the spring 36, while its forward arm is consequently biased downwardly. Upon pressing the release plunger 34 and moving the sleeve 30 downwardly to engage the lever 28, the forward arm of the lever 28 swings upwardly as the arm 26 swings rearwardly to engage the clamping member 24b to clamp the measurement pointer 24. In this clamping position, a locking lever 44 in the form of a bellcrank is disposed beneath the lever 28 with its one arm 44b engaging under the forward arm of the lever 28 to hold it upwardly and secure the clamping of the pointer 24. The locking lever 44 is pivoted at an appropriate place on the camera housing, and its other laterally projecting arm is biased against a stop pin 46 by a spring 44a whose one end engages the pin 46, while its other end presses on the lever arm 44b. With the locking lever 44 biased toward the stop pin 46, the lever arm 44b is engaging underneath the forward arm of the lever 28 to hold it upwardly. The locking lever 44 thus prevents the lever 28 from swinging out in clockwise direction under the action of its spring 36 to release the clamping of the pointer 24 when the operator lets go of the camera release plunger 34. By this arrangement, the pointer 24 remains clamped even should there be a premature release of the plunger 34 by the operator.

To provide an arrangement for releasing the locking lever 44, the stop and feeler lever 22 has a sidewardly projecting arm 22b having a rearwardly bent end disposed beneath the end of the lever arm 44c, in position to swing the lever arm 44c upwardly upon upward movement of the arm 22b. As can be seen in FIG. 2, upon the tensioning of the shutter to swing the stop and feeler lever 22 in a clockwise direction to its starting position, the stop lever 22 is swung beyond the position 22u corresponding to the maximum diaphragm aperture, such as $f:2.8$, in addition over a small idle path into the end position 22e where it may be locked by the engagement of the locking pawl 18 with the control ring 16. The idle path in going into the end position 22e lies beyond the swinging range of the pointer 24 as determined at this end by the stop pin 76". When the stop lever 22 moves over this idle or excess path from the position 22u to the end position 22e, upon the tensioning of the shutter, its arm 22b acting as an unlocking member is swung upwardly into engagement with the arm 44c of the locking lever 44 and swings it in a counterclockwise direction. The other arm 44b of the locking lever 44 consequently swings out from beneath the forward arm of the lever 28, releasing the lever 28 so that the spring 36 can swing the arm 26 to release the clamping of the pointer 24.

The pointer 24 is thus clamped from the time of pressing the camera release plunger 34, until the shutter is tensioned and the automatic diaphragm mechanism has moved to its starting position for the next exposure. No misadjustments and no incorrect pictures can be taken as a result of an accidental premature release of the plunger 34.

In the embodiment of FIG. 3, a locking lever 44' is provided which is similar to the previous locking lever 44 described with regard to the embodiment of FIG. 1, but is considerably larger. The locking lever 44' in this case has an uppermost locking hook 44b' which cooperates with the flange on the release plunger 34, rather than with the lever 28. The other features of construction are similar to those described with regard to FIG. 1. Upon the advance of the film and the tensioning of the shutter, the stop and feeler lever 22 moves to its end position 22e after having gone through a short idle path during which the arm 22b strikes the end 44c' of the locking lever 44', and pivots the locking lever 44' counterclockwise against the force of the spring 44a'. The locking hook 44b' is pivoted out of the path of the release plunger 34.

Upon depressing the camera release plunger 34 to take the exposure, the plunger 34 is pushed downwardly to a position with its flange below the locking hook 44b'. After the clamping of the measurement pointer 24, the stop and feeler lever 22 is released in the manner previously described, and the arm 22b pivots downwardly out of engagement with the lever end 44c'. The spring 44a' urges the lever 44' in a clockwise direction to a limiting position abutting the stop pin 46', and during this movement the locking hook 44b' engages the flange on the camera release plunger 34 and prevents full upward movement of the plunger 34 when it is released by the operator. The plunger 34 is locked in such a position that the spring 32 is compressed and presses down on the sleeve 30, which in turn engages the swinging lever 28 to hold the arm 26 rearwardly, to hold the measurement pointer 24 clamped between the clamping member 24b and the supporting plate 24a. The locking nose 44b' latches the camera release plunger 34 until the film is advanced to take the next frame and the shutter is tensioned, moving the stop and feeler lever 22 in a clockwise direction to its starting end position 22e. During the final part of this movement, the arm 22b engages the lever end 44c' again, and swings the locking lever 44' in a counterclockwise direction to release the locking hook 44b' and allow the plunger 34 to move upwardly to its initial position. Consequently, the lever 28 swings back to its starting position under the action of its spring 36, and the measurement pointer 24 is unclamped ready to measure the scene brightness for the next exposure. A particular advantage of this construction is that it offers visual control of the existing operating condition, as the operator can easily observe, at the top of the camera, whether the plunger 34 is in its depressed position or its elevated position.

In the embodiment of FIG. 4, the locking lever 44″ again has an arm 44b″ which underlies the forward arm of the swinging lever 28 to hold the measurement pointer 24 clamped, much as described with regard to FIG. 1. The lever 44″ is biased to locking position against the stop pin 46″ by the spring 44a″. The unlatching movement of the end 44c″ of the locking lever 44″ is not accomplished by the stop and feeler lever 22 and its arm 22b as was the case with FIG. 1, but is accomplished rather by the engagement of a projection 48a on a slide 48. The slide 48 is disposed for horizontal sliding movement from side to side within the camera body, and has a driving slot 48b at one end for coupling it with the film transport device of the camera, not here shown. Upon advancing the film, the slide 48 is moved in the direction indicated by the arrow, against the force of its return spring 48c.

Movement of the slide 48 also serves to tension the shutter and the automatic diaphragm mechanism to drive the stop and feeler lever 22 into its end position. For this purpose, the slide 48 has a toothed rack portion 48d in meshing engagement with a pinion gear 50 having a forwardly extending driving pin 50a. The tensioning shaft 14a has secured to its rear end a coupling disk 14b′ having a rearwardly extending lug 14b″. Upon movement of the slide 48 in the direction of the arrow, the pinion 50 is driven counterclockwise, and the driving pin 50a engages with the lug 14b″ to rotate the tensioning shaft 14a and tension the shutter, moving the control ring 16 to the cocked position as previously explained.

During the sliding movement of the slide 48 against the force of its return spring 48c, the unlocking projection 48a engages the lever end 44c″ to swing the locking lever 44″ clockwise, moving the lever end 44b″ out from underneath the lever 28. Consequently, the lever 28 swings clockwise under the action of its spring 36, as a result of which the measurement pointer 24 is unclamped. As soon as the film is advanced and tensioning of the shutter and the unclamping of the pointer 24 have been accomplished, the slide 48 is retracted by its return spring 48c until limited by engagement with the stop 48e. During this return movement, the pinion 50 rotates, but the driving pin 50a is not in driving engagement with the lug 14b″, so that the shutter remains in its tensioned position latched by a locking pawl 18, and the tensioning shaft 14a is not affected during this movement. The spring 44a″ tends to turn the locking lever 44″ in a counterclockwise direction, but the arm 44b″ merely strikes the side of the lever 28. Upon depressing the plunger 34 to take the next exposure, the lever 28 is rotated counterclockwise, enabling the arm 44b″ to move counterclockwise under the action of its spring 44a″ to a locking position beneath the forward arm of the lever 28, clamping the measurement pointer 24 until the next movement of advancing the film and tensioning the shutter.

Due to the fact that the measurement pointer, in all these embodiments of the invention, is clamped fast from the initial depression of the release plunger 34, and is unclamped only after the stop member 22 has been returned to its clockwise initial position, the stop member 22 can never strike the pointer 24 as long as the latter is not clamped fast, even if the release plunger 34 is depressed only momentarily and not held down during the entire exposure interval. This is of advantage particularly in the case of the longer automatically timed shutter speeds, when the camera release plunger 34 may be released prematurely before the full operation of the automatic diaphragm mechanism to set the diaphragm aperture in accordance with the position of the measurement pointer 24. The fact that the clamping of the pointer 24 remains for a longer period of time makes it advantageous to employ the invention also in the case of a shutter which is released by a built-in delayed-action mechanism. In the delayed-action type of mechanism, the camera plunger 34 is pressed, but there is an interval of time before the opening and the closing of the shutter blades to make the exposure, so that, for instance, the photographer may get into the picture himself.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a release member operable from an inoperative position to an exposure initiating position, a diaphragm having an adjustable aperture and a diaphragm control ring rotatable through a range to adjust the diaphragm to different aperture sizes, spring means tending to move said diaphragm control ring to a rest position at one end of its range, means for moving said diaphragm control ring to a tensioned position at the opposite end of its range, an exposure meter having a pointer for deflection in accordance with variations in illumination conditions, a feeler engageable with said pointer and coupled to said diaphragm control ring for movement to a limiting position by movement of said diaphragm control ring to its said tensioned position, means movable with the release member for clamping said meter pointer at a deflected position and for releasing said diaphragm control ring for running down movement, said feeler swinging from said limiting position as said diaphragm control ring runs down until engaging said pointer as a stop and holding said diaphragm control ring at the corresponding diaphragm aperture, a releasable lock for holding said clamping means for said meter pointer in clamped position when said release member returns to its inoperative position, and unlocking means for releasing said lock actuated by operation of said means for moving said diaphragm control ring to its said tensioned position and for swinging said feeler to its limiting position.

2. A construction as defined in claim 1, wherein said releasable lock is a double-armed and spring biased lever whose one arm is engageable wtih said means for clamping said meter pointer, for holding said meter pointer in clamped position, the other arm of said double-armed lever lying in the path of movement of said unlocking means to be moved to an unlocking position thereby.

3. A photographic camera comprising a manually actuated release member operable from an inoperative position to a shutter-releasing position, a diaphragm having an adjustable aperture and a diaphragm control ring rotatable through a range to adjust the diaphragm to different aperture sizes, spring means tending to move said diaphragm control ring to a rest position at one end of its range, means for moving said diaphragm control ring to a tensioned position at the opposite end of its range, an exposure meter having a pointer for deflection in accordance with variations in illumination conditions, a feeler engageable with said pointer and coupled to said diaphragm control ring for movement to a limiting position by movement of said diaphragm control ring to its said tension position, means movable with the release member in shutter releasing direction for clamping said meter pointer at a deflected position and for releasing said diaphragm control ring for running down movement, said feeler swinging from said limiting position as said diaphragm control ring runs down until engaging said pointer as a stop and holding said diaphragm control ring at the corresponding diaphragm aperture, a releasable lock for holding the clamping means for said meter pointer in clamped position when said release member returns to its inoperative position, said lock being pivoted about a fixed pivot and having one arm engageable with said manually actuated release member for clamping the meter pointer, a spring for biasing said lock into locking position upon operation of said manually actuated release member, said lock having another arm lying in the path of movement of an unlocking member, said unlocking member engaging said lock to move it to an unlocking position upon actuation of said means for moving said diaphragm control ring to its tensioned position and for swinging said feeler to its limiting position.

4. A construction as defined in claim 3, wherein said releasable lock is a double-armed lever.

5. A photographic camera of the type comprising an exposure meter having a movable pointer, a normally unclamped clamping member for holding said pointer stationary, spring means tending to unclamp said clamping member, a feeler member movable through a range between a first position and a second position, spring means tending to move said feeler member from first position toward second position, said feeler member during such movement engaging said pointer at a variable point depending upon the position of said pointer, the position of said feeler member determining at least in part the exposure value of an exposure to be made, a manually operable trigger member effective upon application of manual pressure to initiate an exposure-making cycle and also to move said clamping member to pointer-clamping position, said feeler member moving from its said first position toward its said second position during an exposure-making cycle, and tensioning means operable after completion of an exposure-making cycle for moving said feeler member back to its first position ready for another exposure-making cycle, characterized by a latch effective to maintain said clamping member in pointer-clamping position when it has been moved to such position by manual pressure applied to said trigger member, so that said latch will keep said pointer clamped during completion of an exposuremaking cycle even though said manual pressure is removed from said trigger member before completion of said cycle, and means effective upon operation of said tensioning means for releasing said latch so that said clamping member may be moved to unclamped position by its spring means.

References Cited in the file of this patent

UNITED STATES PATENTS

| | | |
|---|---|---|
| 2,868,095 | Gebele | Jan. 13, 1959 |
| 2,925,760 | Broschke | Feb. 23, 1960 |